United States Patent
Li et al.

(10) Patent No.: US 9,891,959 B2
(45) Date of Patent: Feb. 13, 2018

(54) STAGE-AWARE PERFORMANCE MODELING FOR COMPUTER CLUSTER SIZING

(71) Applicant: International Business Machines Corporation, Armonk, NY (US)

(72) Inventors: Min Li, San Jose, CA (US); Valentina Salapura, Chappaqua, NY (US); Jian Tan, San Jose, CA (US); Yandong Wang, Elmsford, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/928,997

(22) Filed: Oct. 30, 2015

(65) Prior Publication Data

US 2017/0123855 A1    May 4, 2017

(51) Int. Cl.
G06F 9/50     (2006.01)
G06N 3/12     (2006.01)

(52) U.S. Cl.
CPC ............ *G06F 9/5055* (2013.01); *G06N 3/12* (2013.01)

(58) Field of Classification Search
CPC .............................. G06F 9/5055; G06N 7/005
See application file for complete search history.

(56) References Cited

U.S. PATENT DOCUMENTS

| | | | | |
|---|---|---|---|---|
| 6,578,021 B1 * | 6/2003 | Barillaud | ............ | H04L 12/4641 706/20 |
| 7,689,572 B2 * | 3/2010 | Chu | .................. | G06F 17/30321 707/999.1 |
| 7,937,705 B1 * | 5/2011 | Prael | ..................... | G06F 9/5072 709/201 |

(Continued)

FOREIGN PATENT DOCUMENTS

CN        103279330 A        9/2013

OTHER PUBLICATIONS

Adler, "In Quest of Machine Learning in SQL," metanautix.com/blog/in-quest-of-machine-learning-in-sql/, Copyright 2012-2015, accessed Oct. 30, 2015, 6 pages.

(Continued)

*Primary Examiner* — Benjamin Wu
*Assistant Examiner* — Jorge A Chu Joy-Davila
(74) *Attorney, Agent, or Firm* — Yee & Associates, P.C.; Louis J. Percello

(57) ABSTRACT

A method, apparatus, and computer program product for configuring a computer cluster. Job information identifying a data processing job to be performed is received by a processor unit. The data processing job to be performed comprises a plurality of stages. Cluster information identifying a candidate computer cluster is also received by the processor unit. The processor unit identifies stage performance models for modeled stages that are similar to the plurality of stages. The processor unit predicts predicted stage performance times for performing the plurality of (Continued)

stages on the candidate computer cluster using the stage performance models and combines the predicted stage performance times for the plurality of stages to determine a predicted job performance time. The predicted job performance time may be used to configure the computer cluster.

20 Claims, 5 Drawing Sheets

(56) References Cited

U.S. PATENT DOCUMENTS

| | | | |
|---|---|---|---|
| 2009/0307162 A1* | 12/2009 | Bui | G06N 5/022 706/12 |
| 2013/0254196 A1 | 9/2013 | Babu et al. | |
| 2013/0297625 A1* | 11/2013 | Bierner | G06F 17/30864 707/754 |
| 2014/0215487 A1* | 7/2014 | Cherkasova | G06F 9/5083 718/106 |

OTHER PUBLICATIONS

Adrian et al., "Analytic Platforms: Beyond the Traditional Data Warehouse," vertica.com/wp-content/uploads/2010/12/beyond-traditional-data-warehouse.pdf, Copyright 2010, accessed Oct. 30, 2015, pp. 1-33.

"Analytics Platform," Techopedia, www.techopedia.com/definition/29493/analytics-platform, Copyright 2010-2015, accessed Oct. 30, 2015, 1 page.

Terminology: Analytic Platforms,DBMS2, A Monash Research Publication, www.dbms2.com/2011/02/24/analytic-platforms/, Feb. 24, 2011, 8 pages.

Stonebraker et al., "MapReduce and Parallel DBMSs: Friends or Foes?," Communications of the ACM, vol. 53 No. 1, cacm.acm.org/magazines/2010/1/55743-mapreduce-and-parallel-dbmss-friends-or-foes/fulltext, Jan. 2010, pp. 64-71.

Cui et al., "Modeling the Performance of MapReduce Under Resource Contentions and Task Failures", IEEE Computer Society, CloudCom 2013, Dec. 2, 2013, Abstract Only, 2 pages.

Herodotou et al., "Starfish: A Self-tuning System for Big Data Analyitics", Duke University, Department of Computer Science, 5th Conference of Innovative Data Systems Research, 2011, 12 pages.

Lama et al., "AROMA: Automated Resource Allocation and Configuration of MapReduce Enviornment in the Cloud", University of Colorado at Colorado Springs, Department of Computer Science, ICAC 2012, © 2012, 10 pages.

Tiwari et al., "Modeling and Analyzing Key Performance Factors of Shared Memory MapReduce", North Carolina State University, Department of Electrical and Computer Engineering, IEEE 26th International Parallel and Distributed Processing Symposium, © 2012, 12 pages.

Verma et al., "ARIA: Automatic Resource Inference and Allocation for MapReduce Environments", University of Illinois at Urbana-Chanmpaign, ICAC 2011, Jun. 14-18, 2011, Karlsruhe, Germany, 10 pages.

Wasi-Ur-Rahman et al., "Performance Modeling for RDMA-Enhanced Hadoop MapReduce", Ohio State University, Department of Computer Science and Engineering, 43rd International Conference on Parallel Processing, © 2014, 10 pages.

Yang et al., "An Analytical Performance Model of MapReduce", Zhejiang University, Department of Computer Science and Technology, 2011 IEEE International Conference on Cloud Computing and Intelligence Systems, Sep. 15-17, 2011, 5 pages.

Yigitbasi et al., "Towards Machine Learning-Based Auto-Tuning of MapReduce", 2012 IEEE 20th International Symposium on Modeling, Analysis and Simulation of Computer and Telecommunication Systems, Aug. 14-16, 2013, San Francisco, United States, 10 pages.

Zhang et al., "Performance Modeling of MapReduce Jobs in Heterogeneous Cloud Environments", Hewlett-Packard Labs and the University of Pennsylvania , © 2013, 8 pages.

* cited by examiner

STAGE-AWARE PERFORMANCE MODELING FOR COMPUTER CLUSTER SIZING

BACKGROUND

1. Field

The present disclosure relates generally to computer clusters and to data analytics system and methods for computer clusters. More particularly, the present disclosure relates to predicting the time for performing a data processing job on a cluster computer that takes into account stages for performing the job and for using the predicted processing time to configure the computer cluster.

2. Description of the Related Art

A computer cluster consists of a group of loosely or tightly connected computers that work together so that, in many respects, the computer cluster may be viewed as a single system. A computer cluster may be employed to improve performance and availability over that of a single computer. A computer cluster typically may be much more cost-effective than single computers of comparable speed or availability.

The components of a cluster computer are usually connected to each other through fast local area networks, with each node running its own instance of an operating system. In most circumstances, all of the nodes use the same hardware and the same operating system. However, in some setups, different operating systems, hardware, or both may be used for various computers in a computer cluster.

Computer clustering relies on a centralized management approach which makes the nodes available as orchestrated shared servers. The activities of the computing nodes may be orchestrated by a software layer that sits atop the nodes and allows users to treat that cluster a one cohesive computing unit.

A data analytics platform is an integrated platform providing the management of data as well as the ability to generate programmable analytics from the data. This platform may be made available as software only, packaged hardware and software, a virtual image, or in a cloud based software-as-a-service form. Analytics that may be performed may include statistics, predictive analytics, data mining, linear algebra, optimization, graphing, and others with complex mathematical operations and/or data transformation.

It may be desirable to use data analytics to predict the time to perform a data processing job on a computer cluster. It also may be desirable to use the predicted time for performing a data processing job to configure the computer cluster to perform the data processing job in a more economically efficient manner.

Accordingly, it would be beneficial to have a method and apparatus that take into account one or more of the issues discussed above, as well as possible other issues.

SUMMARY

The illustrative embodiments of the present disclosure provide a method of configuring a computer cluster. Job information identifying a data processing job to be performed is received by a processor unit. The data processing job comprises a plurality of stages. Cluster information identifying a candidate computer cluster is also received by the processor unit. The processor unit identifies stage performance models for modeled stages that are similar to the plurality of stages. The processor unit predicts predicted stage performance times for performing the plurality of stages on the candidate computer cluster using the stage performance models and combines the predicted stage performance times for the plurality of stages to determine a predicted job performance time. The predicted job performance time may be used to configure the computer cluster.

The illustrative embodiments of the present disclosure also provide an apparatus comprising an input receiver, a model selector, a performance predictor, and a configuration manager. The input receiver is configured to receive job information identifying a data processing job to be performed and cluster information identifying a candidate computer cluster. The data processing job comprises a plurality of stages. The model selector is configured to identify stage performance models for modeled stages that are similar to the plurality of stages. The performance predictor is configured to predict a predicted stage performance times for performing the plurality of stages on the candidate computer cluster using the stage performance models and combine the predicted stage performance times for the plurality of stages to determine a predicted job performance time. The configuration manager is configured to use the predicted job performance time to configure the computer cluster.

The illustrative embodiments of the present disclosure also provide for a computer program product comprising first program code, second program code, third program code, fourth program code, fifth program code, and sixth program code stored on a computer readable storage medium. The first program code is for receiving job information identifying a data processing job to be performed, wherein the data processing job comprises a plurality of stages. The second program code is for receiving cluster information identifying a candidate computer cluster. The third program code is for identifying stage performance models for modeled stages that are similar to the plurality of stages. The fourth program code is for predicting predicted stage performance times for performing the plurality of stages on the candidate computer cluster using the stage performance models. The fifth program code is for combining the predicted stage performance times for the plurality of stages to determine a predicted job performance time. The sixth program code is for using the predicted job performance time to configure the computer cluster.

Various features, functions, and benefits may be achieved independently in various embodiments of the present disclosure or may be combined in yet other embodiments in which further details can be seen with reference to the following description and drawings.

DETAILED DESCRIPTION

Figure 1:
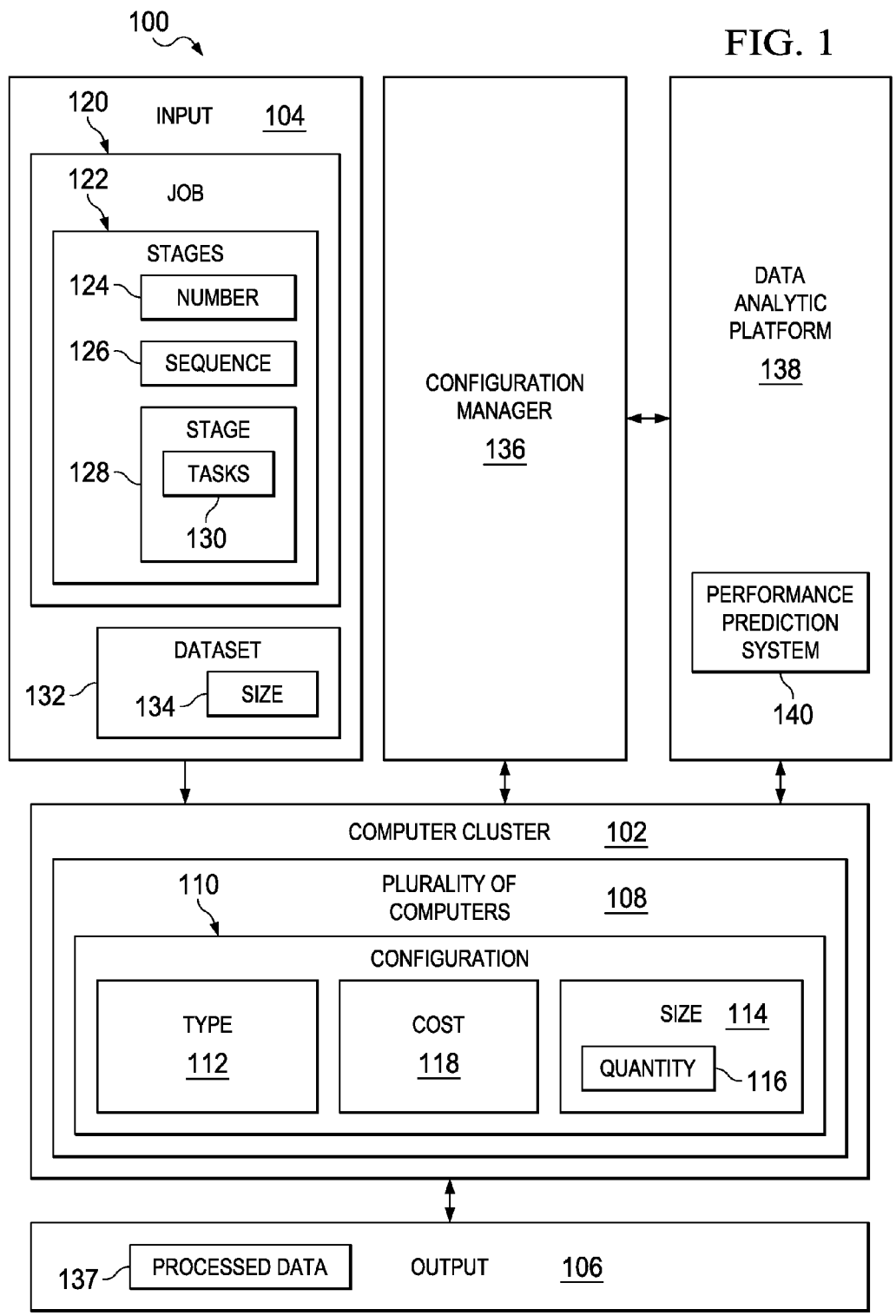
FIG. 1 is a diagram of a data processing environment in accordance with an illustrative embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Different illustrative embodiments recognize and take into account a number of different considerations. "A number," as used herein with reference to items, means one or more items. For example, "a number of different considerations" are one or more different considerations.

The different illustrative embodiments recognize and take into account that frequently users do not know what cluster size provides the best cost for performance trade-off for a particular data processing job. Configuring a computer cluster may require in-depth understanding of application characteristics.

Illustrative embodiments provide for improved configuration of a computer cluster using performance modeling that takes into account the stages of the job to be performed.

Turning to FIG. 1, a diagram of a data processing environment is depicted in accordance with an illustrative embodiment. Data processing environment 100 comprises computer cluster 102. Computer cluster 102 may be configured in any appropriate manner to process input 104 to provide output 106.

Computer cluster 102 may comprise plurality of computers 108. Plurality of computers 108 may be configured in any appropriate configuration 110 to form computer cluster 102. Configuration 110 may be defined by type 112 and size 114. Type 112 refers to the type or types of plurality of computers 108. Size 114 of configuration 110 refers to quantity 116 of computers in plurality of computers 108 forming computer cluster 102. Configuration 110 of computer cluster 102 may have cost 118 for processing input 104 to provide output 106.

Input 104 may be a data processing job 120. Job 120 may be referred to as a workload.

Job 120 may be defined by a plurality of stages 122. Stages 122 may be defined by number 124 of stages 122 and sequence 126 in which stages 122 are performed to complete job 120. For example, without limitation, sequence 126 of stages 122 may be represented by a directed acyclic graph or in any other appropriate manner. Each stage 128 in stages 122 may be defined by a number of tasks 130.

Job 120 also may be defined by dataset 132 that is to be processed through stages 122 of job 120. Dataset 132 may be defined by size 134.

Output 106 may comprise processed data 137. In this example, processed data 137 may be dataset 132 as processed through stages 122 of job 120 by computer cluster 102.

Configuration manager 136 may be used to set up configuration 110 of computer cluster 102 to process job 120. Data analytic platform 138 may be configured to provide various analytics associates with the operation of computer cluster. Apache Spark is one example, without limitation, of data analytic platform 138.

In accordance with an illustrative embodiment, performance prediction system 140 may be configured to predict the time for configuration 110 of computer cluster 102 to perform job 120. For example, without limitation, performance prediction system 140 may be implemented to take advantage of the various analytical processes provided by data analytic platform 138. The prediction provided by performance prediction system 140 may be used to set up or change configuration 110 of computer cluster.

Figure 2:
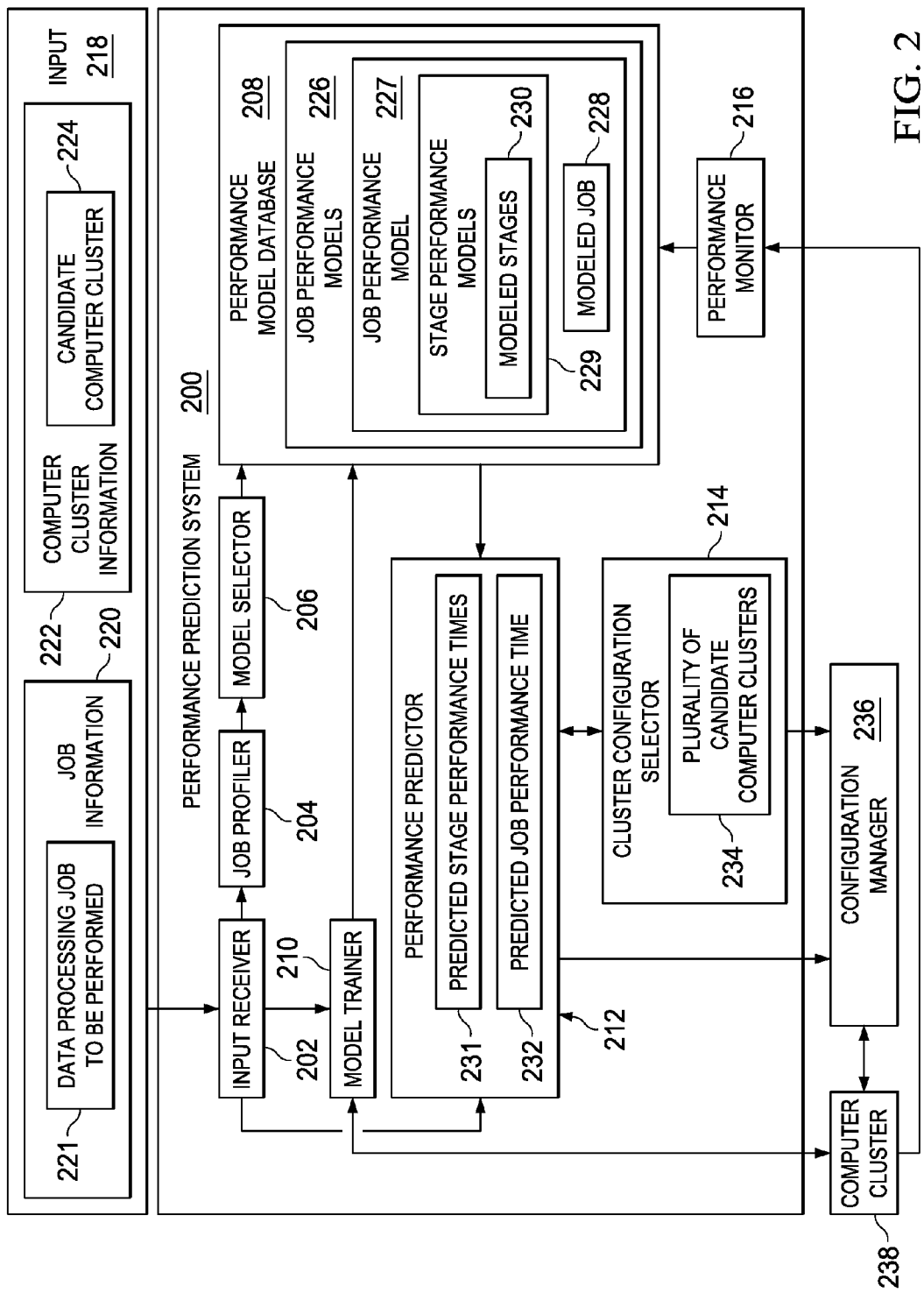
FIG. 2 is a diagram of a performance prediction system in accordance with an illustrative embodiment.

Turning to FIG. 2, a diagram of a performance prediction system is depicted in accordance with an illustrative embodiment. Performance prediction system 200 may be an example of one implementation of performance prediction system 140 in FIG. 1.

Performance prediction system 200 may include input receiver 202, job profiler 204, model selector 206, performance model database 208, model trainer 210, performance predictor 212, cluster configuration selector 214, and performance monitor 216.

Input receiver 202 may be configured to receive input 218. Input 218 may include job information 220 and computer cluster information 222. Job information 220 may define data processing job to be performed 221. For example, data processing job to be performed 221 may be defined by a number of stages and dataset. The dataset may have a particular size.

Computer cluster information 222 may include information describing the configuration of candidate computer cluster 224. Candidate computer cluster 224 may be a computer cluster configuration that is under consideration for processing data processing job to be performed 221 defined by job information 220.

Job profiler 204 may be configured to determine various characteristics of data processing job to be performed 221 defined by job information 220. For example, without limitation, job profiler 204 may identify the number and sequence of stages in data processing job to be performed 221. Job profiler 204 also may identify various characteristics of the stages of data processing job to be performed. For example, without limitation, job profiler 204 may identify characteristics of the stages such as the number of tasks in a stage, the stage resource profile, the data access pattern for the stage, output selectivity for the stage, an amount of shuffle for the stage, resource consumption dynamicity for the stage, and data set content sensitivity for the stage. The various characteristics of data processing job to be performed 221 as identified by job profiler 204 may be used by model selector 206 to select models from performance model database 208.

Performance model database 208 may comprise job performance models 226 for various data processing jobs. Each job performance model 227 in job performance models 226 may be for modeled job 228. Each job performance model 227 may comprise a number of stage performance models 229 for various modeled stages 230.

Model trainer 210 may be configured to train a job performance model when it is determined that a job performance model for data processing job to be performed 221 is not available. For example, without limitation, model trainer 210 may be configured to train a model using a test dataset when a test run is allowed to be run on candidate computer cluster 224.

Performance predictor 212 is configured to use job performance models 226 and stage performance models 229 from performance model database 208 to determine a predicted time to process a job on candidate computer cluster 224. For example, without limitation, performance predictor 212 may be configured to predict predicted stage performance times 231 for the plurality of stages of data processing job to be performed 221 using appropriate stage performance models 229. Performance predictor 212 may combine predicted stage performance times 231 for data processing job to be performed 221 to predict predicted job performance time 232 for performing data processing job to be performed on candidate computer cluster 224.

Cluster configuration selector 214 may be configured to perform a search through plurality of candidate computer clusters 234, using predicted job performance time 232 for each of the candidate computer clusters as provided by performance predictor 212, to select a desired configuration for the computer cluster. For example, the desired configuration may be the configuration that performs the data processing job at the lowest cost. The selection made by cluster configuration selector 214 may be used by configuration manager 236 to configure computer cluster 238 with the desired configuration to process data processing job to be performed 221.

Performance monitor 216 may be configured to monitor the performance of computer cluster 238 as a data processing job is performed. Performance monitor 216 may use this information to train or improve job performance models 226 and stage performance models 229 in performance model database 208.

The illustrations of FIG. 1 and FIG. 2 are not meant to imply physical or architectural limitations to the manner in which different illustrative embodiments may be implemented. Other components in addition to, in place of, or in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 3:
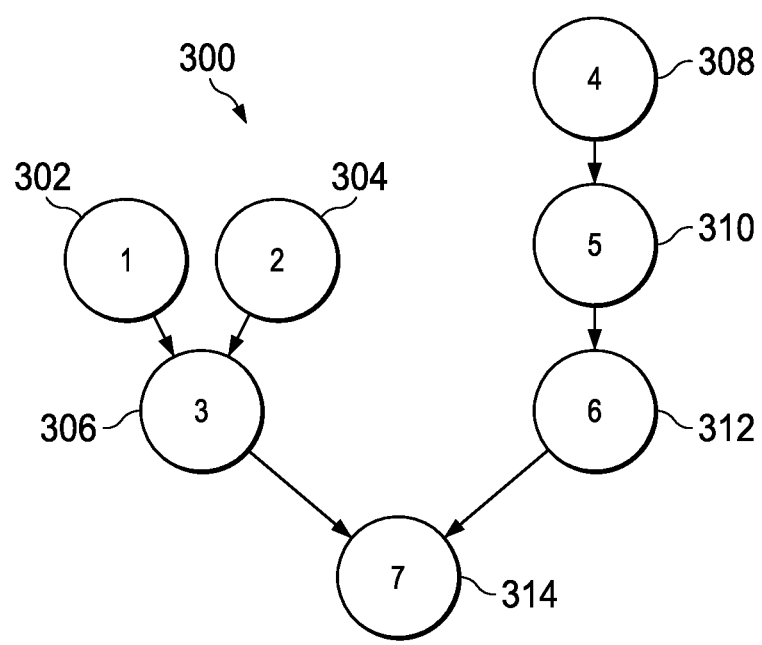
FIG. 3 is a diagram of a directed acyclic graph of the stages of a data processing job in accordance with an illustrative embodiment.

Turning to FIG. 3, a diagram of a directed acyclic graph of the stages of a data processing job is depicted in accordance with an illustrative embodiment. Stages 300 may be an example of stages 122 in job 120 in FIG. 1.

In accordance with an illustrative embodiment, the time for completing the data processing job comprising stages 302, 304, 306, 308, 310, 312, and 314 may be predicted by first predicting a time, $T_{SX}$, for completing each stage. The predicted times for each stage then may be combined to determine the predicted time for the entire job.

In this example, the predicted time for completing the job, $T_{job}$, may be determined as follows:

$$T_{job}=\max(\max(T_{S1}, T_{S2})+T_{S3},(T_{S4}+T_{S5}+T_{S6}))+T_{S7}.$$

Figure 4:
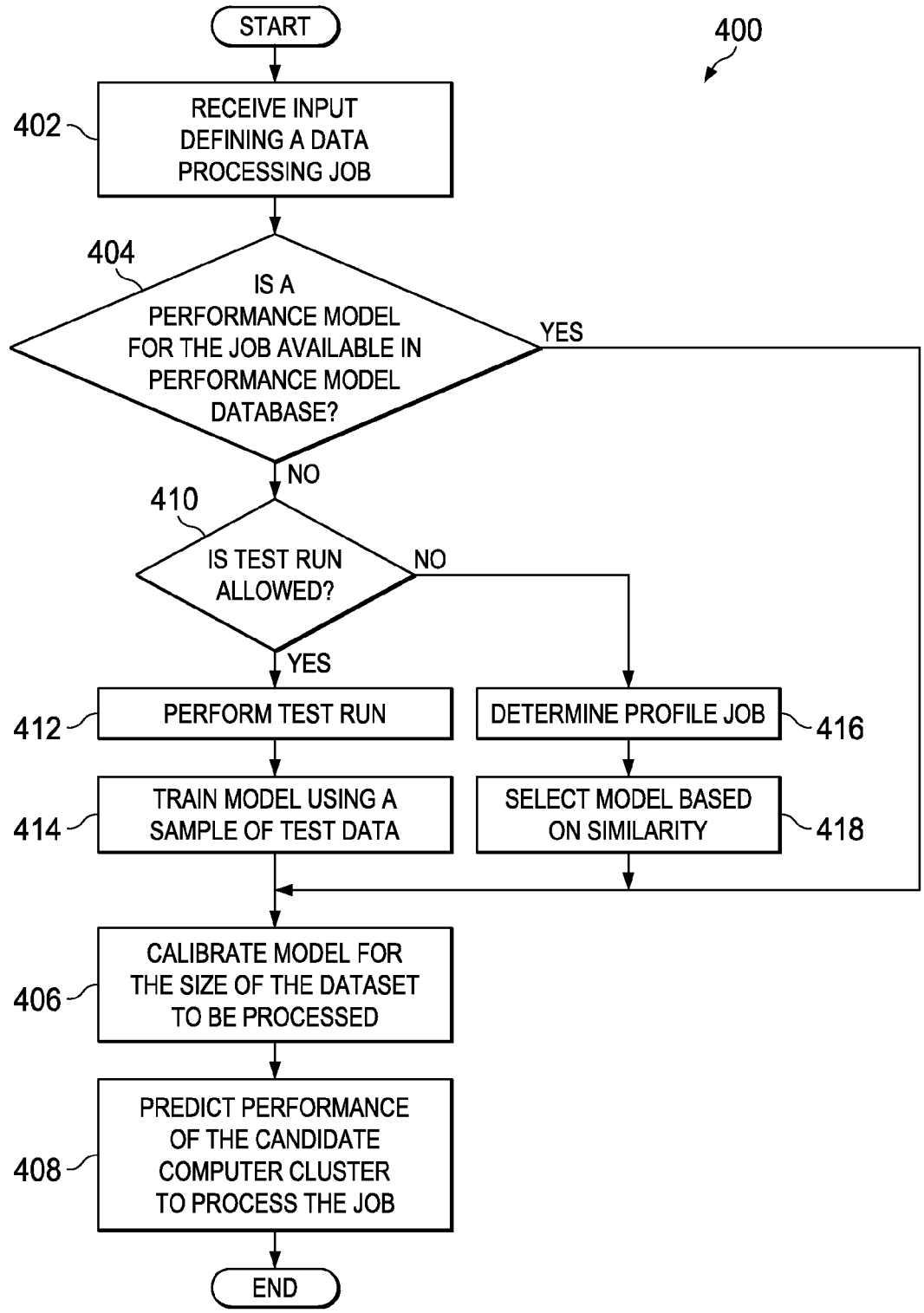
FIG. 4 is a flowchart of a process for predicting the performance of a data processing job in accordance with an illustrative embodiment.

Turning to FIG. 4, a flowchart of a process for predicting the performance of a data processing job is depicted in accordance with an illustrative embodiment. Process 400 may be performed, for example, by performance prediction system 200 in FIG. 2.

Process 400 may begin with receiving input defining a data processing job (step 402). The input may also define a candidate computer cluster on which the job will be performed.

It then may be determined whether a performance model for the job is available in a performance model database (step 404). When a performance model for the job is available in the model database, the model may be calibrated for the size of the dataset to be processed (step 406). The calibrated model then may be used to predict the performance of the candidate computer cluster to process the job (step 408), with the process terminating thereafter.

In response to a determination at step 404 that a performance model for the job is not available, it may be determined whether a test run is allowed (step 410). If a test run is allowed, a test run may be performed (step 412). The test run may be performed using a sample of test data to train a model (step 414) of the job. The resulting model may then be calibrated for the full job dataset at step 406 and the performance of the job predicted at step 408, with the process terminating thereafter.

In response to a determination at step 410 that a test run is not allowed, a profile of the job may be determined (step 416). Step 416 may identify various characteristics of the job such as, without limitation, the number of stages and the sequence of stages. Step 416 may identify various characteristics of the stages of a job such as, without limitation, the number of tasks in the stage. Job performance models and stage performance models for jobs and stages that have similar characteristics then may be selected from the performance model database (step 418). The selected models then may then be calibrated for the full job dataset at step 406 and the performance of the job predicted at step 408, with the process terminating thereafter.

Figure 5:
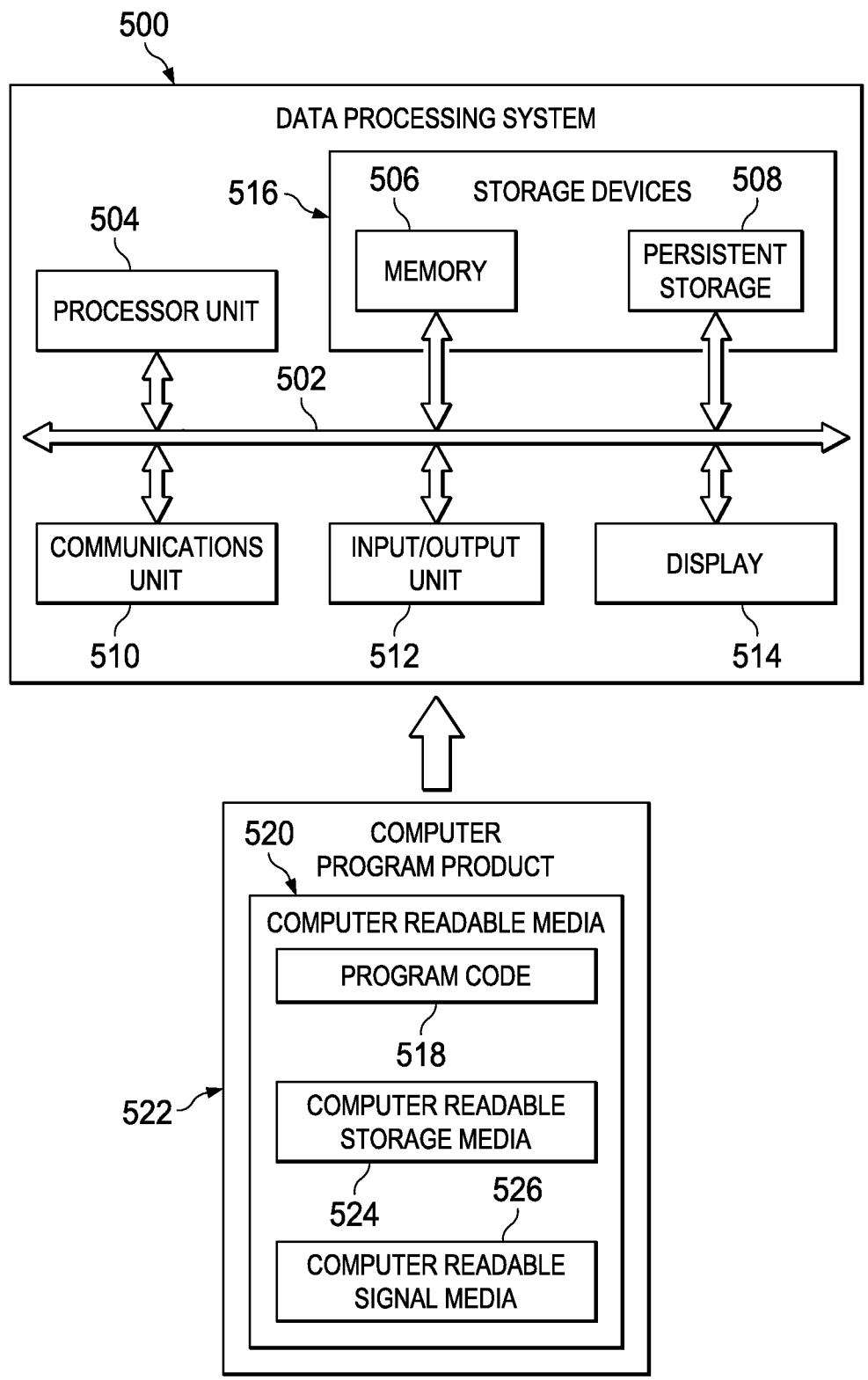
FIG. 5 is a diagram of a data processing system in accordance with an illustrative embodiment.

Turning to FIG. 5, a diagram of a data processing system on which various functions may be implemented is depicted in accordance with an illustrative embodiment. Data processing system 500 may be an example of one implementation of a data processing system on which functions of performance prediction system 200 in FIG. 2 are implemented. In this illustrative example, data processing system 500 includes communications fabric 502. Communications fabric 502 provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506 may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer-usable program code, or computer readable program code that may be read and executed by a processor in processor unit 504. The program code in the different embodiments may be embodied on different physical or computer readable storage media 524, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 920 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is a medium that can be touched by a person.

Alternatively, program code 518 may be transferred to data processing system 500 using Computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or transmit and receive data. Communications unit 510 may be, for example, a modem or a network adapter, two network adapters, or some combination thereof. Further, a memory may be, for example, memory 506, or a cache, such as those found in an interface and memory controller hub that may be present in communications fabric 502.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description, and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of configuring a computer cluster, the computer implemented method comprising:
   receiving, by a processor unit, job information identifying a data processing job to be performed, wherein the data processing job to be performed comprises a plurality of stages, and wherein the job information defines characteristics of the plurality of stages that include number of tasks, resource profile, data access pattern, output selectivity, amount of shuffle, resource consumption dynamicity, and data set content sensitivity of respective stages in the plurality of stages of the data processing job;
   receiving, by the processor unit, cluster information identifying a candidate computer cluster;
   identifying, by the processor unit, stage performance models for corresponding to modeled stages having similar characteristics to the characteristics of plurality of stages that include the number of tasks, resource profile, data access pattern, output selectivity, amount of shuffle, resource consumption dynamicity, and data set content sensitivity of the respective stages in the plurality of stages of the data processing job;
   predicting, by the processor unit, stage performance times for performing the plurality of stages on the candidate computer cluster using the stage performance models;
   combining, by the processor unit, the predicted stage performance times to determine a predicted job performance time;
   using, by the processor unit, the predicted job performance time to configure the candidate computer cluster to perform the data processing job; and
   performing, by the candidate computer cluster, the date processing job.

2. The computer-implemented method of claim 1 further comprising:
   determining, by the processor unit, whether a job performance model for the data processing job to be performed is available in a performance model database; and
   using, by the processor unit, the job performance model to determine the predicted job performance time in response to the processor unit determining that the job performance model for the data processing job to be performed is available in the performance model database.

3. The computer-implemented method of claim 2 further comprising:
   responsive to the processor unit determining that the job performance model for the data processing job to be performed is not available in the performance model database, performing, by the processor unit, a test run on the candidate computer cluster using a test dataset to train a resulting job performance model for the data processing job to be performed on the candidate computer cluster.

4. The computer-implemented method of claim 3 further comprising:
   identifying, by the processor unit, the job performance model in the performance model database for a modeled data processing job that is similar to the data processing job to be performed; and
   identifying, by the processor unit, the stage performance models in the performance model database for the modeled stages having the similar characteristics to the characteristics of the plurality of stages of the data processing job to be performed on the candidate computer cluster.

5. The computer-implemented method of claim 4 further comprising:
   identifying, by the processor unit, the job performance model in the performance model database based on a similarity between a number and sequence of stages in the modeled data processing job and the number and sequence of the plurality of stages comprising the data processing job to be performed on the candidate computer cluster; and
   identifying, by the processor unit, the stage performance models in the performance model database based on a similarity of identified characteristics between the plurality of stages of the data processing job to be performed and the modeled stages.

6. The computer-implemented method of claim 1, wherein the job information defines a dataset size, and further comprising:
   selecting, by the processor unit, a plurality of candidate computer clusters to perform the data processing job based on the dataset size of the data processing job;
   determining, by the processor unit, the predicted job performance time to perform the data processing job to be performed for the dataset size for each candidate computer cluster in the plurality of candidate computer clusters;
   determining, by the processor unit, an estimated cost to perform the data processing job to be performed for each candidate computer cluster in the plurality of candidate computer clusters using the predicted job performance time for each candidate computer cluster in the plurality of candidate computer clusters; and
   using, by the processor unit, the estimated cost to select a configuration of one of the plurality of candidate computer clusters to configure the candidate computer cluster.

7. The computer-implemented method of claim 1, wherein using, by the processor unit, the predicted job performance time to configure the candidate computer cluster to perform the data processing job further comprises:
   configuring, by the processor unit, a size of the candidate computer cluster.

8. A computer system for configuring a computer cluster, the computer system comprising:
   a bus system;
   a storage device connected to the bus system, wherein the storage device stores computer readable program code; and
   a processor unit connected to the bus system, wherein the processor unit executes the computer readable program code to:
   receive job information identifying a data processing job to be performed and cluster information identifying a candidate computer cluster, wherein the data processing job to be performed comprises a plurality of stages; and wherein the job information defines characteristics of the plurality of the stages that include the number of tasks, resource profile, data access pattern, output selectivity, amount of shuffle, resource consumption dynamicity, and data set content sensitivity of respective stages in the plurality of stages of the data processing job;

identify stage performance models corresponding to modeled stages having similar characteristics to the characteristics of that plurality of stages include the number of tasks, resource profile, data access pattern, output selectivity, amount of shuffle, resource consumption dynamicity, and data set content sensitivity of the respective stages in the plurality of stages of the data processing job;

predict stage performance times for performing the plurality of stages on the candidate computer cluster using the stage performance models and combine the predicted stage performance times for the plurality of stages to determine a predicted job performance time;

use the predicted job performance time to configure the candidate computer cluster to perform the data processing job; and perform the data processing job.

9. The computer system of claim 8, wherein the processor unit further executes the computer readable program code to:

determine whether a job performance model for the data processing job to be performed is available in a performance model database; and use the job performance model for the data processing job to be performed to determine the predicted job performance time in response to a determination that the job performance model for the data processing job to be performed is available in the performance model database.

10. The computer system of claim 9, wherein the processor unit further executes the computer readable program code to:

perform a test run on the candidate computer cluster using a test dataset to train a resulting job performance model for the data processing job to be performed on the candidate computer cluster in response to determining that the job performance model for the data processing job to be performed is not available in the performance model database; and use the job performance model for the data processing job to be performed on the candidate computer cluster to determine the predicted job performance time.

11. The computer system of claim 8, wherein the processor unit further executes the computer readable program code to:

identify a job performance model in a performance model database for a modeled data processing job that is similar to the data processing job to be performed based on a similarity between a number and sequence of stages in the modeled data processing job and the number and sequence of the plurality of stages comprising the data processing job to be performed on the candidate computer cluster.

12. The computer system of claim 8, wherein the processor unit further executes the computer readable program code to:

identify the stage performance models in a performance model database based on a similarity of characteristics between the plurality of stages of the data processing job to be performed and the modeled stages.

13. The computer system of claim 8, wherein the processor unit further executes the computer readable program code to:

select a plurality of candidate computer clusters to perform the data processing job based on a dataset size of the data processing job;

determine the predicted job performance time to perform the data processing job to be performed for the dataset size for each candidate computer cluster in the plurality of candidate computer clusters; and determine an estimated cost to perform the data processing job to be performed for each candidate computer cluster in the plurality of candidate computer clusters using the predicted job performance time for each candidate computer cluster in the plurality of candidate computer clusters.

14. The computer system of claim 8, wherein the processor unit further executes the computer readable program code to:

use the predicted job performance time to configure a size of the candidate computer cluster.

15. A computer program product for configuring a computer cluster, the computer program product comprising a computer readable storage medium having program instructions embodied therewith, the program instructions executable by a computer to cause the computer to perform a method comprising:

receiving job information identifying a data processing job to be performed, wherein the data processing job to be performed comprises a plurality of stages, and wherein the job information defines characteristics of the plurality of stages that include number of tasks, resource profile, data access pattern, output selectivity, amount of shuffle, resource consumption dynamicity, and data set content sensitivity of respective stages in the plurality of stages of the data processing job;

receiving cluster information identifying a candidate computer cluster;

identifying stage performance models corresponding to modeled stages having similar characteristics to the characteristics of the plurality of stages that include the number of tasks, resource profile, data access pattern, output selectivity, amount of shuffle, resource consumption dynamicity, and data set content sensitivity of the respective stages in the plurality of stages of the data processing job;

predicting stage performance times for performing the plurality of stages on the candidate computer cluster using the stage performance models;

combining the predicted stage performance times for the plurality of stages to determine a predicted job performance time;

using the predicted job performance time to configure the candidate computer cluster to perform the data processing job; and performing the data processing job.

16. The computer program product of claim 15 further comprising:

determining whether a job performance model for the data processing job to be performed is available in a performance model database; and using the job performance model for the data processing job to be performed to determine the predicted job performance time in response to determining that the job performance model for the data processing job to be performed is available in the performance model database.

17. The computer program product of claim 16 further comprising:
responsive to determining that the job performance model for the data processing job to performed is not available in the performance model database,
performing a test run on the candidate computer cluster using a test dataset to train a resulting job performance model for the data processing job to be performed on the candidate computer cluster.

18. The computer program product of claim 17 further comprising:
to identifying the job performance model in the performance model database for a modeled data processing job that is similar to the data processing job to be performed on the candidate computer cluster.

19. The computer program product of claim 18 further comprising:
identifying the stage performance models in the performance model database based on a similarity of characteristics between the plurality of stages of the data processing job to be performed and the modeled stages; and
identifying the job performance model in the performance model database based on a similarity between a number and sequence of stages in the modeled data processing job and the number and sequence of the plurality of stages comprising the data processing job to be performed on the candidate computer cluster.

20. The computer program product of claim 15 further comprising:
selecting a plurality of candidate computer clusters to perform the data processing job based on a dataset size of the data processing job;
determining the predicted job performance time for performing the data processing job to be performed for the dataset size for each candidate computer cluster in the plurality of candidate computer clusters; and
determining an estimated cost to perform the data processing job to be performed for each candidate computer cluster in the plurality of candidate computer clusters using a corresponding predicted job performance time for each candidate computer cluster.

* * * * *